(12) United States Patent
Songer

(10) Patent No.: US 7,774,020 B2
(45) Date of Patent: Aug. 10, 2010

(54) METHOD AND SYSTEM FOR ASCERTAINING WHETHER MULTIPLE RADIOS ARE ASSOCIATED WITH A SINGLE WIRELESS DEVICE

(75) Inventor: Christopher M. Songer, Louisville, KY (US)

(73) Assignee: ConnectSoft, Inc., Louisville, KY (US)

( * ) Notice: Subject to any disclaimer, the term of this patent is extended or adjusted under 35 U.S.C. 154(b) by 437 days.

(21) Appl. No.: 11/620,298

(22) Filed: Jan. 5, 2007

(65) Prior Publication Data
US 2008/0168031 A1    Jul. 10, 2008

(51) Int. Cl.
*H04M 1/00* (2006.01)
(52) U.S. Cl. ............... 455/553.1; 455/552.1; 455/41.2; 455/414.1; 370/338; 709/250
(58) Field of Classification Search ............ 455/414, 455/552.1, 553.1, 41.2; 370/338
See application file for complete search history.

(56) References Cited

U.S. PATENT DOCUMENTS

| | | | |
|---|---|---|---|
| 7,120,129 B2 | 10/2006 | Ayyagari et al. | |
| 7,420,942 B2 * | 9/2008 | Wang | 370/329 |
| 2004/0064591 A1 * | 4/2004 | Noble | 709/250 |
| 2004/0093376 A1 | 5/2004 | De Boor et al. | |
| 2004/0110530 A1 | 6/2004 | Alone et al. | |
| 2005/0176420 A1 * | 8/2005 | Graves et al. | 455/424 |
| 2006/0126537 A1 * | 6/2006 | Booth | 370/255 |
| 2006/0221919 A1 * | 10/2006 | McRae et al. | 370/338 |
| 2007/0130286 A1 * | 6/2007 | Hopmann et al. | 709/217 |
| 2008/0151842 A1 * | 6/2008 | Tysowski et al. | 370/338 |

OTHER PUBLICATIONS

ISA/US, International Search Report and the Written Opinion of the International Searching Authority for International Application No. PCT/US07/86445, mailed Apr. 2, 2008.

\* cited by examiner

*Primary Examiner*—Kent Chang
*Assistant Examiner*—Magdi Elhag
(74) *Attorney, Agent, or Firm*—Stites & Harbison, PLLC; David W. Nagle, Jr.; Jeffrey A. Haeberlin

(57) ABSTRACT

A computer-based method and system for ascertaining whether multiple radios available for connection to a mobile computing device are associated with a single wireless device comprise the steps of: using the mobile computing device to receive data from a radio of a wireless device; querying a database to ascertain whether the mobile computing device has previously identified that radio; if not, sending a request for identifying information to the radio; if no response is received, scanning the received data from the radio to look for and capture identifying information; processing the captured identifying information into a simplified name; querying the database to ascertain whether the mobile computing device has previously identified another radio with a similar simplified name, which indicates that the respective radios are associated with a single wireless device; communicating information that the respective radios are associated with a single wireless device to one or more software applications; and storing the simplified name in the database for future queries.

4 Claims, 2 Drawing Sheets

METHOD AND SYSTEM FOR ASCERTAINING WHETHER MULTIPLE RADIOS ARE ASSOCIATED WITH A SINGLE WIRELESS DEVICE

BACKGROUND OF THE INVENTION

The present invention is a computer-based method and system for ascertaining whether multiple radios available for connection to a mobile computing device are associated with a single wireless device.

Mobile computing devices, such as laptop computers, personal data assistants (PDAs), and pocket computers, are commonly transported from location to location. Such mobile computing devices are increasingly provided with wireless networking capabilities, allowing the mobile computing devices to look for and connect to wireless devices and networks as they are transported from location to location. For example, a user can carry a laptop computer into a new environment, access a local network, and then move files between computing devices or print to available network printers. However, there remain some barriers to efficient operation of mobile computing devices as they transition from one location to another.

For instance, many wireless devices have more than one radio for communication. Each radio can uniquely identify itself with respect to the wireless medium over which it communicates. For example, a Bluetooth® radio has a unique identifier (i.e., the BD_ADDR), so two different Bluetooth® radios can never be confused. (Bluetooth® is a registered trademark of Bluetooth Sig, Inc. of Bellevue, Wash.) However, suppose that a mobile computing device, such as a laptop computer, has a Bluetooth® radio and an 802.11 radio, and that the laptop computer is in a location where it can connect to a wireless device, such as a printer, that also has a Bluetooth® radio and an 802.11 radio. When the laptop computer identifies wireless devices available for connection in the location, it should locate and identify the Bluetooth® connection between itself and the printer, and it should also locate and identify the 802.11 connection between itself and the printer. Each radio on the printer should have a unique identifier, such as the BD_ADDR for the Bluetooth® radio, but each such identifier is specific to the wireless medium. Therefore, the laptop computer will recognize and "see" two separate printers—one associated with the Bluetooth® radio and one associated with the 802.11 radio. However, there is no way to ascertain that the two radios available for connection to the laptop computer are associated with the same printer.

SUMMARY OF THE INVENTION

The present invention is a computer-based method and system for ascertaining whether multiple radios available for connection to a mobile computing device are associated with a single wireless device.

A exemplary method for ascertaining whether multiple radios available for connection to a mobile computing device are associated with a single wireless device commences with a mobile computing device (such as a laptop computer) receiving data from the radios of one or more wireless devices available for connection in a location. Once data has been received from a radio of a particular wireless device available for connection, the next step is to query a database of radio information to ascertain whether the mobile computing device has previously identified that radio and associated it with a particular wireless device. If the mobile computing device has not previously identified the radio of the wireless device, a request for identifying information may be sent to the radio of the wireless device to solicit information about the wireless device and its radios. If no such request is initiated or no response is received to such a request for identifying information within a predetermined time period, the next step is scanning the received data from the radio of the wireless device to look for and capture identifying information, such as the device name assigned by a networking protocol. Once a potential name has been identified and extracted from the incoming data, the potential name may be converted into a simplified name by removing any extraneous data, including spaces, punctuation, and any medium-specific identifiers. Once the potential device name has been identified and processed in this manner, the next step is to query the database of radio information to ascertain whether the mobile computing device has previously identified another radio with a similar simplified name, which indicates that the respective radios are associated with a single wireless device. If there is such a "match," this information can then be communicated to software applications running on the mobile computing device. Finally, irrespective of whether the mobile computing device has previously identified another radio with a similar simplified name, the simplified name is stored in the database of radio information for future queries and comparisons.

To carry out the exemplary method described above, the mobile computing device may host a digital computer program that includes appropriate modules for executing the requisite instructions for performing the operational steps of the method: (a) a radio management module for receiving data from the radios of one or more wireless devices available for connection in a location; (b) an analysis module for querying the database of radio information to retrieve information about each radio and then to ascertain whether the mobile computing device has previously identified that radio and associated it with a particular wireless device; (c) a data scanning module for looking for identifying information in the incoming data; (d) a name processing module for converting identifying information into a simplified name for each radio; (e) a second analysis module for querying the database of radio information to ascertain whether the mobile computing device has previously identified another radio with a similar simplified name; and (f) an application interface for communicating information that multiple radios are associated with the wireless device to one or more software applications running on the mobile computing device.

Furthermore, to the extent that the method includes the step of sending a request for identifying information to the radio of the wireless device, the digital computer program would also include: (g) an information exchange module for sending such a request for identifying information to the radio of the wireless device and receiving any response to the request.

DETAILED DESCRIPTION OF THE INVENTION

The present invention is a computer-based method and system for ascertaining whether multiple radios available for connection to a mobile computing device are associated with a single wireless device.

Figure 1:
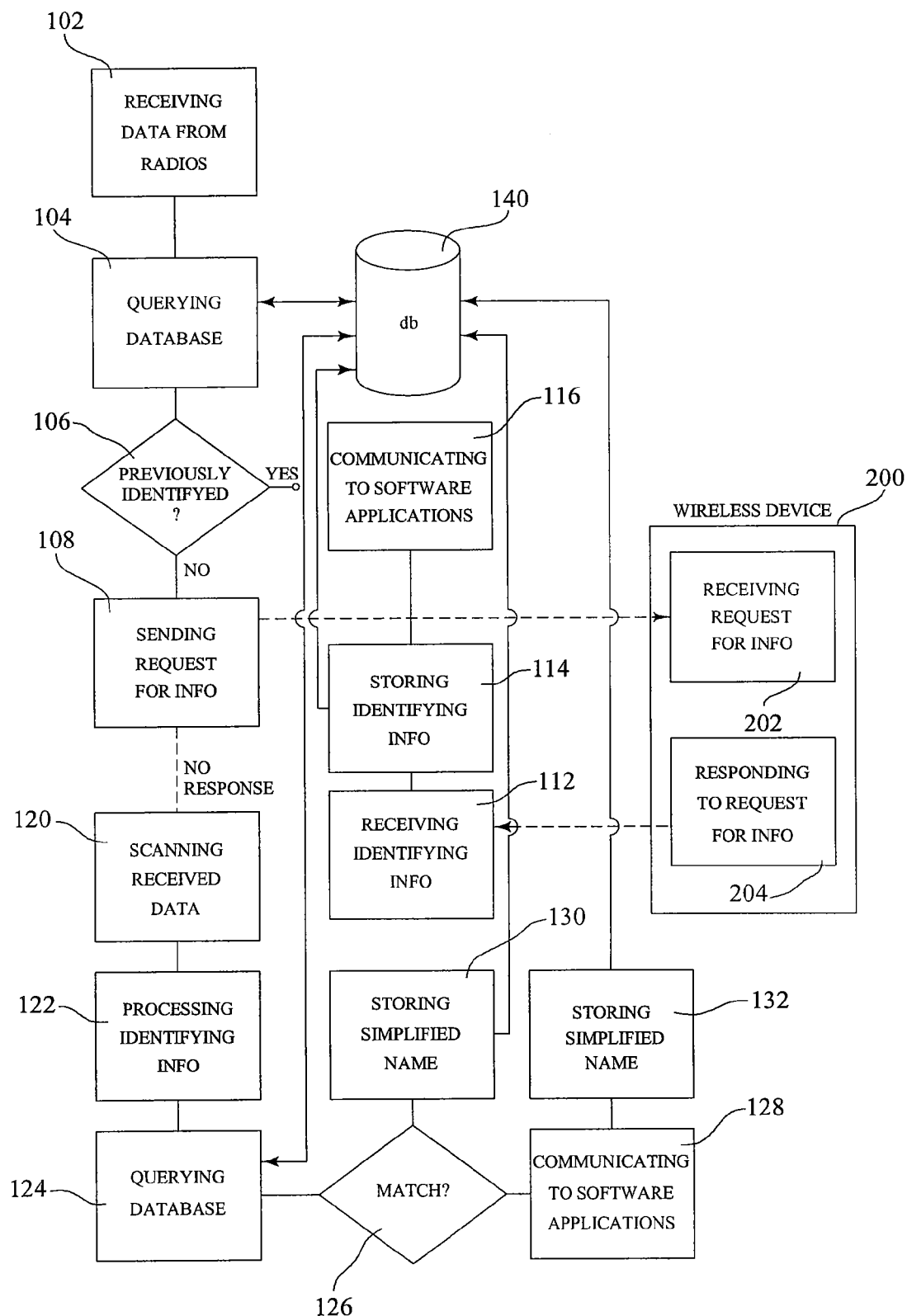
FIG. 1 is a flow chart illustrating an exemplary method for ascertaining whether multiple radios available for connection to a mobile computing device are associated with a single wireless device.

FIG. 1 is a flow chart illustrating an exemplary method for ascertaining whether multiple radios available for connection to a mobile computing device are associated with a single wireless device. As will become clear in the description that follows, the operational steps of this method are preferably achieved through the use of a digital computer program, i.e., computer-readable instructions stored and executed by a computer. Accordingly, the mobile computing device hosts a digital computer program stored on a computer-readable medium that includes appropriate modules for executing the requisite instructions. Such instructions can be coded into a computer-readable form using standard programming techniques and languages, and with benefit of the following description, such programming is readily accomplished by one of ordinary skill in the art.

Referring still to FIG. 1, the method commences with a mobile computing device (such as a laptop computer) receiving data from the radios of one or more wireless devices available for connection in the location, as indicated by step 102. Such data would generally include identifying information, such as: (a) the type of radio (Bluetooth®, 802.11, etc.); (b) the unique identifier of the radio (BD_ADDR for Bluetooth®, SSID for 802.11, etc.); and (c) signal strength information. For purposes of the description that follows, the mobile computing device may be termed a "discovering device" that is looking for wireless devices around it to provide services. The wireless devices that are present and/or available for connection in the location, such as a printer, may be termed "service devices."

Once data has been received from a radio of a particular wireless device available for connection, the next step is to query a database of radio information 140 to retrieve information about the radio, as indicated by step 104, and then to ascertain whether the mobile computing device has previously identified that radio and associated it with a particular wireless device, as indicated by decision 106. In this regard, the database 140 stores a unique identifier for each radio it encounters and associates the radio with a particular wireless device, as will be further discussed below. If the mobile computing device has previously identified that radio, the process ends as the mobile computing device "knows" that the radio is associated with a particular wireless device.

If the mobile computing device has not previously identified the radio of the wireless device, the next step is to send a request for identifying information to the radio of the wireless device, as indicated by step 108. Specifically, the request solicits information about the wireless device and its radios. However, there is no guarantee that any response will be received, as such a request is only effective if the wireless device is running software that can receive and process such a request. If such software is present and running, the wireless device 200 receives the request, as indicated by step 202. A response is then generated and transmitted to the mobile computing device that includes a device identifier, along with an identification of the types of radio present on the wireless device and the unique identifiers of each radio, as indicated by step 204. Such information is then received by the wireless computing device, as indicated by step 112, and then stored in the database 140, as indicated by step 114, so that the mobile computing device will be able to identify that the radios that are associated with the particular wireless device in the future. In this regard, the information that the two radios available for connection are associated with a single wireless device can also be communicated to software applications running on the mobile computing device, as indicated by step 116. For example, when the wireless device is a printer, the "match" may be communicated to the operating system so that it recognizes that there is only a single printer, rather than two separate printers.

If no response is received to the request for identifying information within a predetermined time period, the next step is scanning the received data from the radio of the wireless device to look for and capture identifying information. Specifically, in addition to processing the incoming data to the appropriate networking stacks, the incoming data from each radio of the wireless devices available for connection is scanned to look for identifying information, such as the device name assigned by the Bluetooth® protocol, as indicated by step 120. With respect to such scanning, it should be recognized that many networking and communications protocols will ask devices for names. Then, any such identifying information that can be extracted from the incoming data is processed, as indicated by step 122. For example, once a potential name has been identified and extracted from the incoming data, the potential name may be converted into a simplified name by removing any extraneous data, including spaces, punctuation, and any medium-specific identifiers. For example, "BLUETOOTH_JoePrinter" would be converted into "joeprinter."

Once the potential device name has been identified and processed in this manner, the next step is to query the database 140, as indicated by step 124, to ascertain whether the mobile computing device has previously identified another radio with a similar simplified name, which indicates that the respective radios are associated with a single wireless device, as indicated by decision 126. This decision is based on an assumption that a similar simplified name would be assigned to a device irrespective of the networking protocol. Returning to the above example, if the simplified name of the device was "joeprinter" based on identifying information extracted from the Bluetooth® data, and that simplified name was stored in the database 140, when identifying information extracted from the 802.11 data also resulted in the simplified name "joeprinter," the query of the database 140 would identify the "match." Thus, the conclusion would be that the two radios available for connection are associated with the same wireless device. Accordingly, if there is such a "match," this information can be communicated to software applications running on the mobile computing device, as indicated by step 128. For example, when the wireless device is a printer, the "match" may be communicated to the printer manager of the operating system so that it recognizes that there is only a single printer, rather than two separate printers.

Irrespective of whether the mobile computing device has previously identified another radio with a similar simplified name, the simplified name is stored in the database 140 for future queries and comparisons, as indicated by steps 130, 132.

Figure 2:
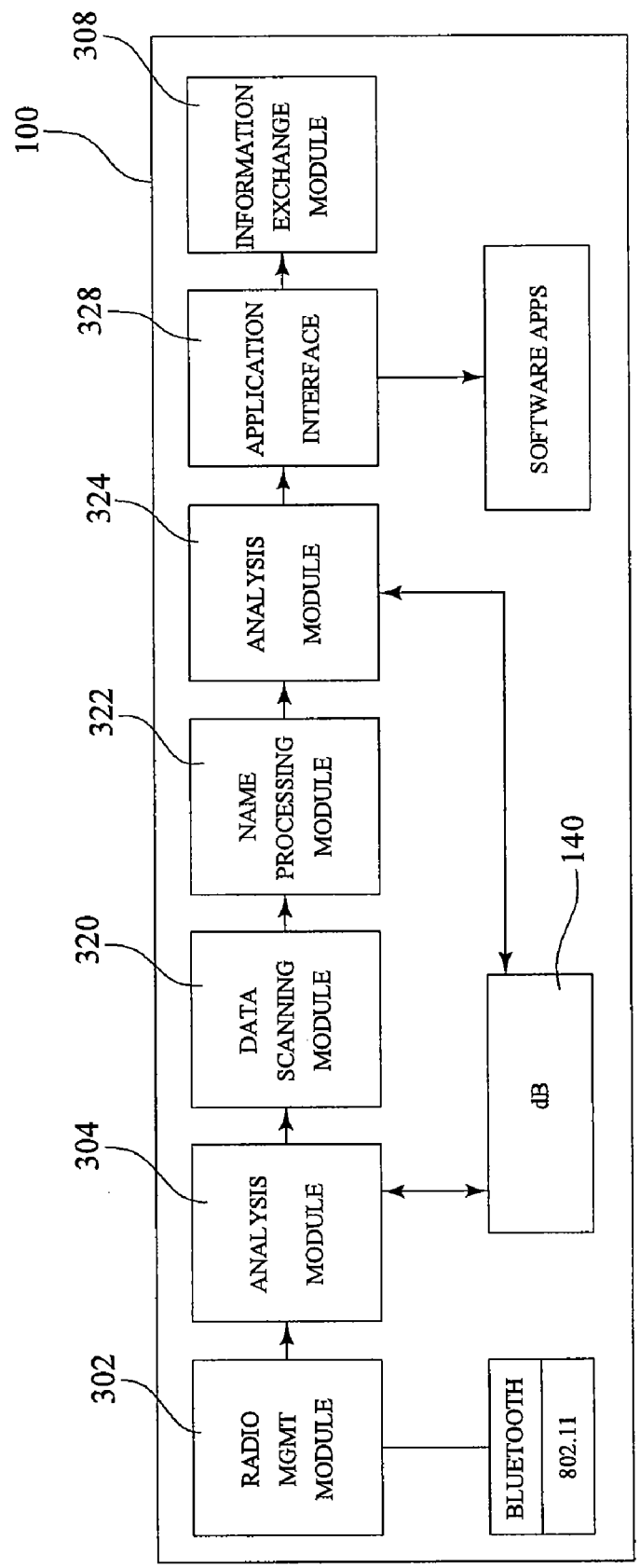
FIG. 2 is a schematic representation of a mobile computing device, including the appropriate modules for executing the requisite instructions for performing the operational steps of the method illustrated in FIG. 1.

FIG. 2 is a schematic representation of a mobile computing device and a wireless device, including the appropriate modules for executing the requisite instructions for performing the operational steps of the method illustrated in FIG. 1. The mobile computing device 100 hosts a digital computer program that includes appropriate modules for executing the requisite instructions for performing the operational steps of the method: (a) a radio management module 302 for receiving data from the radios of one or more wireless devices available for connection in a location; (b) an analysis module 304 for querying the database of radio information 140 to retrieve information about each radio and then to ascertain whether the mobile computing device has previously identified that radio and associated it with a particular wireless device; (c) a data scanning module 320 for looking for identifying information in the incoming data; (d) a name processing module 322 for converting identifying information into a simplified name for each radio; (e) a second analysis module 324 for querying the database 140 to ascertain whether the mobile computing device has previously identified another radio with a similar simplified name; and (f) an application interface 328 for communicating information that multiple radios are associated with the wireless device to one or more software applications running on the mobile computing device.

Furthermore, to the extent that the method includes the step of sending a request for identifying information to the radio of the wireless device, as indicated by step 108 of FIG. 1, the digital computer program would also include: (g) an information exchange module 308 for sending such a request for identifying information to the radio of the wireless device and receiving any response to the request. As mentioned above, for such a request to be effective, the wireless device must be running software that can receive and process such a request.

One of ordinary skill in the art will recognize that additional embodiments are also possible without departing from the teachings of the present invention or the scope of the claims which follow. This detailed description, and particularly the specific details of the exemplary implementation disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A computer-based method for ascertaining whether multiple radios of multiple radio types available for connection to a mobile computing device are associated with a single wireless device, comprising the steps of:

using the mobile computing device to receive data from a radio of the single wireless device;

querying a database of radio information to ascertain whether the mobile computing device has previously identified the radio and associated it with the single wireless device;

if the mobile computing device has not previously identified the radio of the single wireless device, then sending a request to the single wireless device for identifying information, including identification of all radios associated with the single wireless device; and upon receipt of identifying information indicating that multiple radios of multiple radio types are associated with the single wireless device,
      communicating information that multiple radios of multiple radio types are associated with the single wireless device to one or more software applications running on the mobile computing device, and
      storing the identifying information in the database.

2. The method as recited in claim 1, and further comprising the steps of:

if no identifying information is received in response to the request for identifying information in a predetermined time period, scanning the received data from the radio of the single wireless device to look for and capture identifying information;

processing any captured identifying information to remove extraneous data, resulting in a simplified name of the radio of the wireless device;

querying the database to ascertain whether the mobile computing device has previously identified another radio of a different radio type with a similar simplified name, which indicates that the respective radios are associated with the single wireless device;

communicating information that the respective radios are associated with the single wireless device to one or more software applications running on the mobile computing device; and storing the simplified name in the database and associating it with the single wireless device.

3. A computer-based method for ascertaining whether multiple radios of multiple radio types available for connection to a mobile computing device are associated with a single wireless device, comprising the steps of:

using the mobile computing device to receive data from a radio of the single wireless device;

scanning the received data from the radio of the single wireless device to look for and capture identifying information;

processing any captured identifying information to remove extraneous data, resulting in a simplified name of the radio of the wireless device;

querying a database of radio information to ascertain whether the mobile computing device has previously identified another radio of a different radio type with a similar simplified name, which indicates that the respective radios are associated with the single wireless device;

communicating information that the respective radios are associated with the single wireless device to one or more software applications running on the mobile computing device; and storing the simplified name in the database and associating it with the single wireless device.

4. A computer-based system for ascertaining whether multiple radios of multiple radio types available for connection to a mobile computing device are associated with a single wireless device, comprising:

a radio management module resident on a computer-readable medium of the mobile computing device for receiving data from radios of one or more wireless devices available for connection in a location;

an analysis module resident on the computer-readable medium of the mobile computing device for querying a database of radio information to retrieve information about each radio and then to ascertain whether the mobile computing device has previously identified each radio and associated each radio with a corresponding wireless device;

a data scanning module resident on the computer-readable medium of the mobile computing device for looking for identifying information in incoming data from each radio;

a name processing module resident on the computer-readable medium of the mobile computing device for converting the identifying information into a simplified name for each radio;

a second analysis module resident on the computer-readable medium of the mobile computing device for querying the database of radio information to ascertain for each simplified name whether the mobile computing device has previously identified another radio of a different radio type with a similar simplified name, which indicates that the respective radios are associated with a corresponding single wireless device; and an application interface for communicating information that multiple radios of multiple radio types are associated with the corresponding single wireless device to one or more software applications running on the mobile computing device.

* * * * *